United States Patent [19]
No

[11] Patent Number: 6,106,172
[45] Date of Patent: *Aug. 22, 2000

[54] METHOD AND PRINTER UTILIZING A SINGLE MICROPROCESSOR TO MODULATE A PRINTHEAD AND IMPLEMENT PRINTING FUNCTIONS

[75] Inventor: Young No, Pittsford, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/028,609

[22] Filed: Feb. 24, 1998

[51] Int. Cl.[7] .................................................. B41J 2/315
[52] U.S. Cl. ...................................................... 400/120.01
[58] Field of Search .............................. 400/120.01, 103; 395/115; 347/211

[56] References Cited

U.S. PATENT DOCUMENTS

| | | | |
|---|---|---|---|
| 4,261,039 | 4/1981 | Baker et al. | 364/519 |
| 4,277,191 | 7/1981 | Davis et al. | 400/582 |
| 4,449,201 | 5/1984 | Clark | 364/900 |
| 4,648,045 | 3/1987 | Demetrescu | 364/518 |
| 4,679,169 | 7/1987 | De La Salle et al. | 364/900 |
| 5,051,925 | 9/1991 | Kadona et al. | 364/519 |
| 5,132,701 | 7/1992 | Stephenson et al. | 346/1.1 |
| 5,140,341 | 8/1992 | Fiscella et al. | 346/1.1 |
| 5,164,993 | 11/1992 | Capozzi et al. | 382/6 |
| 5,394,515 | 2/1995 | Lentz et al. | 395/115 |
| 5,395,181 | 3/1995 | Dezse et al. | 400/103 |
| 5,559,547 | 9/1996 | Hagar | 347/211 |
| 5,559,951 | 9/1996 | Lentz et al. | 395/163 |
| 5,563,987 | 10/1996 | Scott | 395/115 |
| 5,592,595 | 1/1997 | Wakabayashi et al. | 395/115 |

Primary Examiner—John S. Hilten
Assistant Examiner—Charles H. Nolan, Jr.
Attorney, Agent, or Firm—Walter S. Stevens

[57] ABSTRACT

Both a method and printer are provided that utilize a single microprocessor to modulate a thermal printhead and implement all other printing functions. In the method of the invention, the microprocessor expands numerical image data in the form of binary numbers indicative of the color tone of an image pixel into data bit streams. The microprocessor then stores at least a portion of each of the data bit streams in a temporary memory, and sequentially collates single bits of each of the data bit streams into a serial string of data bits which are then loaded into a shift register to modulate the thermal elements of the printhead. The storage of the expanded numerical image data into a temporary memory obviates the need for the microprocessor to expand each binary number of the image data a multiplicity of times, thereby allowing the microprocessor to modulate the thermal printhead while freeing up its capacity to implement all of the other necessary printing functions, thereby obviating the need for the ASIC used to modulate the printhead in prior art printers.

19 Claims, 5 Drawing Sheets

METHOD AND PRINTER UTILIZING A SINGLE MICROPROCESSOR TO MODULATE A PRINTHEAD AND IMPLEMENT PRINTING FUNCTIONS

BACKGROUND OF THE INVENTION

The invention generally relates to both a method and a printer for printing an image onto a carrier from numerical image data which utilizes a single microprocessor both to modulate a thermal printhead and to implement all of the printing functions.

Thermal printers include a single row of thermal elements for printing a single line of an image onto a print carrier such as paper. Each thermal element is in reality an electrical resistance heater that fuses dye from a donor onto the print medium. When a particular thermal element is energized by a flow of electrical current therethrough, it generates heat which causes dye from a donor (such as a dye ribbon) to transfer onto the image carrier. The density or tone of the printed image is a function of the temperature of the thermal printing element and the time the element is heated.

In the prior art, the modulation of the thermal printing elements (i.e., the actuation and deactuation of each element to achieve the desired color tone) has been implemented by a high-speed, application specific integrated circuit (hereinafter referred to as an ASIC). The ASIC translates a series of binary numbers generated by the microprocessor into print commands for the thermal elements, while the microprocessor coordinates the other printing functions, such as paper and ribbon advances, etc. The applicant has observed that both the structural complexity and expense of manufacturing such thermal printers could be significantly reduced if the microprocessor could be used to modulate the printhead, thereby obviating the need for the ASIC. However, before the difficulties associated with such a design can be appreciated, some further background as to the structure and operation of such printers is necessary. In the printhead of such printers, the thermal printing elements are arranged in a row which may include anywhere from 512 to several thousand printing elements. Each of the thermal elements in the printhead is intermittently connected to a power source via switches in the form of NAND gates. The NAND gates either connect or disconnect their respective thermal elements to the power source in response to "0" or "1" data bits received from a latch circuit. Each of the latch circuits is in turn connected to a one-bit wide gate of a shift register which receives a string of image data from an ASIC. In operation, the shift register serially loads data bits from the stream of image data into the latch circuits through its gates in accordance with clock pulses supplied by the microprocessor. In a printer wherein the tone of each pixel printed by a thermal element is described by a six-bit binary number, 64 possible data bits in the form of "1s" and "0s" are admitted through each shift register gate for every line of a specific color printed by the thermal printhead, which in turn allows the printhead to generate 64 different tones of a color per pixel.

The ASIC generates each string of data bits by converting each of the six-bit binary numbers into a 64 bit data stream. It then serially loads the first data bit from each stream into the shift register for each of the 512 thermal elements, whereupon the shift register gates are simultaneously opened to send the first of 64 actuating "1s" or deactuating "0s" to the thermal elements. This procedure is repeated 63 more times, whereupon the printing of a single line of the image has been completed. The printer then advances the print medium a predetermined line increment, and the process is repeated until the complete image is rendered.

The design of such thermal printers could be simplified and their manufacturing costs reduced if the microprocessor which controls the other functions in the printer could somehow also function to modulate the printhead, thereby eliminating the ASIC. Additionally, the use of a microprocessor for modulation would confer a number of desirable engineering flexibilities to the operation of the printer, as the microprocessor could be programmed to accommodate different modulation schemes used in different printers (i.e., pulse width modulation versus pulse count modulation), as well as different modulation functions in order to improve print quality (i.e., front end or tail end loading of actuating data bits, etc.). However, despite the recent advances in the operating speed of commercially available microprocessors (such as RISC type processors), there are still no cost effective microprocessors presently available that are capable of performing all of the computations necessary to expand the image data binary numbers and collate selected bits therefrom into the shift register while still performing the incremental paper advances and other functions necessary for the printer to operate.

Clearly, there is a need for a novel printer and method of operation which would allow a single microprocessor to effectively modulate the thermal printhead while still performing the other functions incident to a printing operation. Ideally, such a printer and method should be simple and inexpensive to construct and implement so that all of the advantages of structural simplification and cost reduction could be realized.

SUMMARY OF THE INVENTION

The invention is both a printer and method for printing an image onto a carrier that utilizes a single microprocessor to modulate a printhead having a row of printing elements actuatable and deactuatable by data bits from a shift register. In the method of the invention, the microprocessor expands the numerical image data into data bits, and stores the data bits in a temporary memory before collating and transferring them to the shift register. The storage step of the method advantageously eliminates the necessity for the microprocessor to expand each binary number of the image data for each bit of data loaded into the shift register, therefore greatly accelerating the modulation process and freeing up the microprocessor to carry out all of the other operations of the printer. The microprocessor may expand the numerical image data and store it in a temporary memory either before the initiation of a printing operation, or during the time that the printer advances the carrier after each line of the image is printed by the row of printing elements.

The numerical image data may include a plurality of binary numbers, each of which indicates a specific tone level for a pixel in the image printed by a particular printing element. For example, the image data may be in the form of six-bit numbers, each of which designates 64 different tones in a tone scale. The microprocessor expands each six-bit number into a stream of 64 "0" and "1" type data bits, and transfers each data bit stream into a temporary memory. During a printing operation, the microprocessor sequentially collates the first data bit of each stream in order to form a string of data that has been loaded into the shift register. This collation step is repeated until the 64th bit of each data stream is transferred to the shift register, thereby completing the printing of a single line of the image for one color.

The conversion of the numerical image data may be done either by means of a look-up table or an algorithm.

Additionally, the temporary memory may be either excess RAM capacity existing in the microprocessor after programming, or a separate, four kilobyte memory added to the microprocessor.

Both the method and printer of the invention advantageously allow a single microprocessor to modulate the printhead and implement all of the other printing operations without the need for an ASIC, thereby reducing costs. Moreover, the reprogrammable nature inherent in a microprocessor allows the same hardware to implement different modulation schemes and functions in a variety of different printheads to improve print quality.

DETAILED DESCRIPTION OF THE INVENTION

Figure 1:
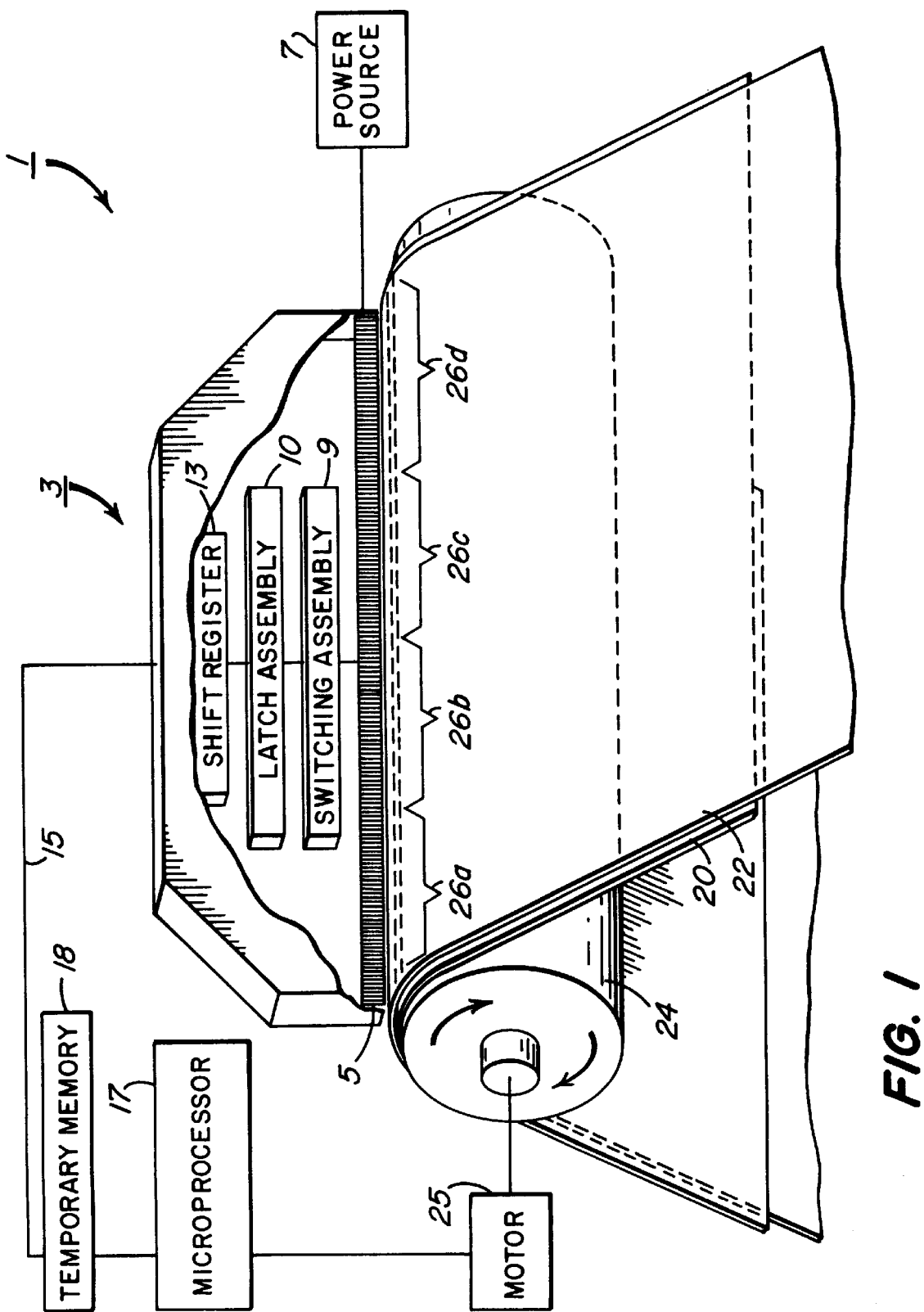
FIG. 1 is a schematized perspective view of the printer of the invention, illustrating the principal components involved in implementing the method.

With reference now to FIG. 1, wherein like numerals designate like components throughout all of the several figures, the printer 1 of the invention includes a printhead 3 having a row of thermal elements 5. The printer 1 may have between 512 to several thousand thermal elements 5 depending upon the degree of pixel resolutions desired.

Figure 2:
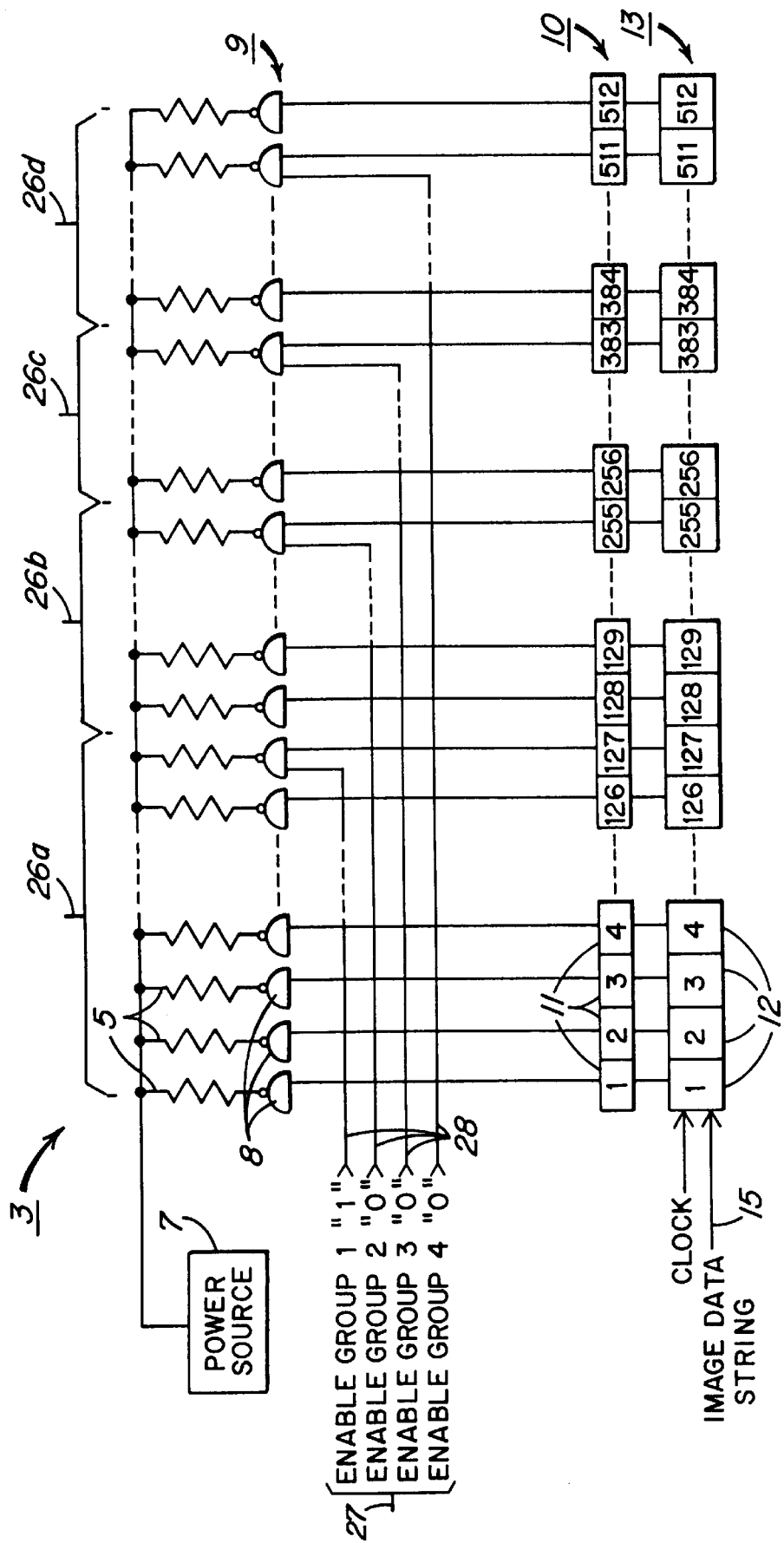
FIG. 2 is a schematic diagram of the conventional printhead used in the printer illustrated in FIG. 1.

With reference now to FIGS. 1 and 2, each of the thermal elements 5 is connectable to a power source 7 via an individual NAND gate 8 of a switching assembly 9. Each of the NAND gates 8 is actuated by a "closed gate" or "open gate" digital signal in the form of either a "1" or "0" relayed to it from a specific latch circuit 11 of a latch assembly 10. Each of the latch circuits 11 in turn receives its "close gate" or "open gate" digital signals from one of the one-bit wide gates 12 of a shift register 13. Finally, the shift register 13 receives the data bit signals that it loads into the gates 12 from a string of image data 15 generated by a microprocessor 17. In FIG. 2, the numbers "1, 2, 3, . . . 511, 512" contained within the schematically-represented gates 12 of the shift register 13 correspond to the pixel numbers generated by the 512 thermal elements 5 of the printhead 3.

The printhead 3 of the printer generates an image on a printing carrier, such as a sheet of thermal paper 20, by selectively actuating the thermal elements 5 over a dye ribbon 22 that overlies the paper 20. The dye ribbon 24 is independently movable over the paper 20 by spooling rollers (not shown) and includes serially connected areas of cyan, magenta, and yellow dyes that are fusible onto the paper 20 when touched by an actuated heating element 5. A rotatably mounted platen roll 24 supports both the thermal paper 20 and the dye ribbon 22 as shown. The roll 24 is connected to an electric motor 25 which is controlled by the microprocessor 17 to incrementally advance the thermal paper 20 every time the row of thermal elements 5 completes the printing of a horizontal line of the image in order to place the row of thermal elements 5 over a new location on the paper 20.

In the example of the printer 1 illustrated in FIG. 1, there are 512 thermal elements 5, and the microprocessor 17 is programmed to supply a six-bit data number per thermal element 5 per color per row of printing. As the darkness or lightness of the color of a particular pixel is dependent upon the amount of time that the corresponding thermal element 5 is heated, the six-bit capacity of the thermal printer 1 for each color allows the printhead 3 to provide 64 shades of cyan, yellow, and magenta for each pixel of the printed image.

With reference now to FIG. 2, conventional printheads 3 divide the thermal elements 5 into two or more enable groups 26a–d by the provision of specific enable group wiring 27 connected to the drain leads of the NAND gates 8. Wiring 27 sequentially conducts multiplexed switching signals 28 from the microprocessor 17 to the thermal elements 5 of each enable group 26a–d. In the particular example illustrated in FIG. 2, each of the thermal elements 5 requires approximately 48 milliamps at 24 volts whenever its respective NAND gate 8 is closed in response to a "1" data bit received by its source lead from its respective latch circuit 11, and a "1" received by the drain lead through the enable wiring 27. There would be no need for dividing the thermal elements 5 into enable group if the power source 7 had a current capacity of 24.6 amps at 24 volts. However, if it is desired to operate the printhead 3 with a less expensive 24 volt power source 7 having a current capacity of only 6.5 amps, then it is necessary to divide the thermal elements into four enable groups 26a–d to avoid overtaxing of the power source 7. If the thermal elements 5 are so divided, each of the four groups 26a–d would draw, at a maximum, no more than 6.15 amps, which is well within the capacity of the 6.5 amp power source 7.

Figure 3:
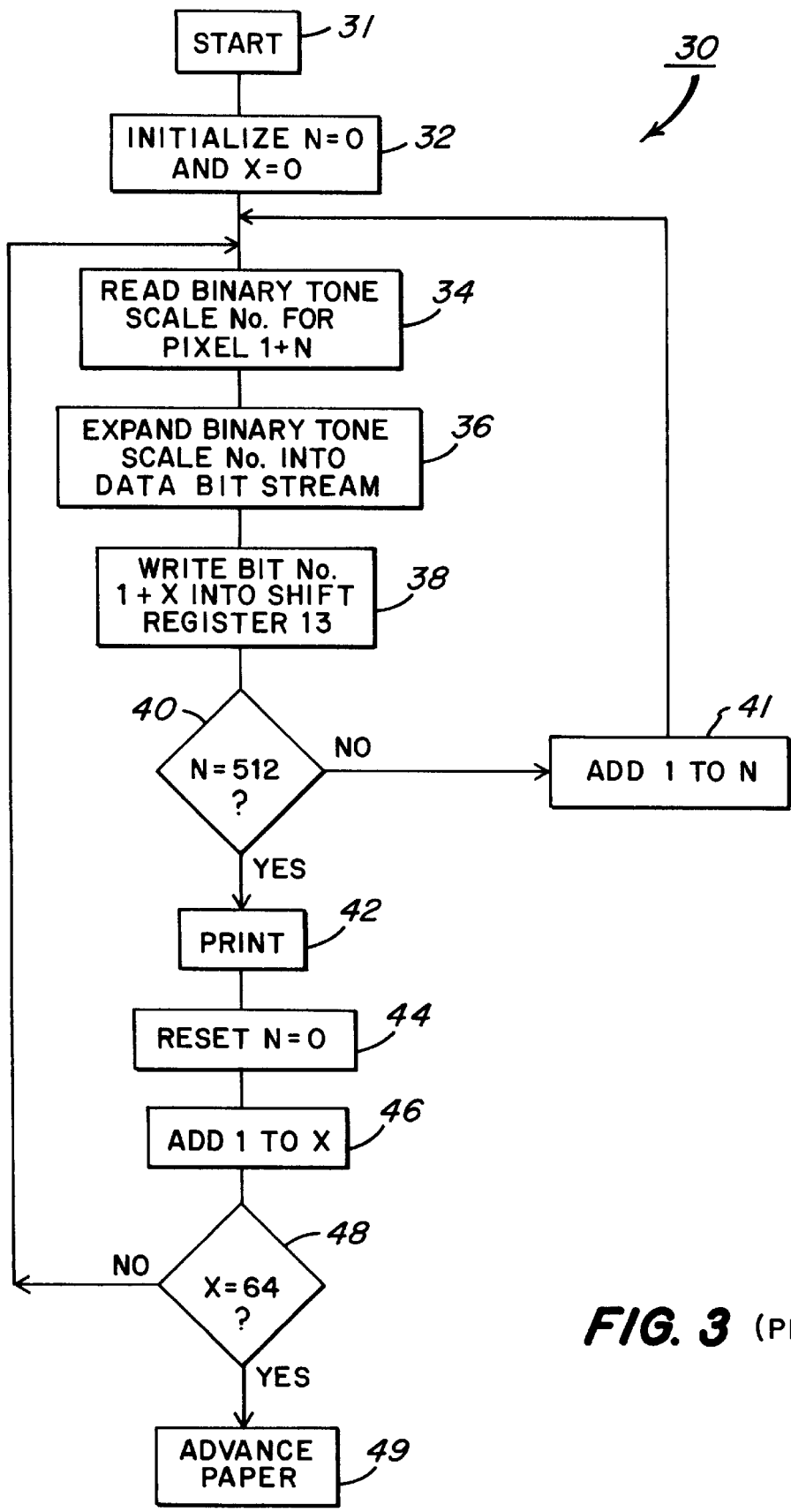
FIG. 3 is a flow chart illustrating a prior art method for operating the printer and printhead illustrated in FIGS. 1 and 2.

FIG. 3 is a flow chart illustrating a prior art method 30 of operating the printhead 3 illustrated in FIG. 2 with the combination of a microprocessor and an ASIC (not shown). After this process 30 is started (as indicated in step 31), both pixel number N and tone scale data bit number X are initialized to "0", as is indicated in step 32. Next, the ASIC reads the binary tone scale number (which in this example is a six-bit number) for the first pixel of the image line, as is indicated in step 34. In step 36, the ASIC proceeds to expand the number read in step 34 into a data bit stream which, in the instant example, will constitute a serial stream of 64 "0s" and "1s". This concept is best understood by way of example. Suppose the binary tone scale number read in step 34 were 111100. The corresponding base 10 number would be "61", and the corresponding data stream would be three "0s", followed by 61 "1s". Such a data stream when serially fed through gate 1 of the shift register 13 would result in the heating element 5 corresponding to pixel 1 being actuated 61 times out of 64 opportunities for actuation, which would result in a dark coloration of the corresponding pixel. Of course, since the overall objective of the method 30 is to operate all 512 heating elements 5 simultaneously in parallel, as to opposed to serially and sequentially, additional steps 38–49 are provided.

In step 38, the ASIC writes the first bit of the data stream generated in step 36 into the shift register 13, which would result in the loading of a "0" data bit into gate 1 of the shift register 13 if the binary tone scale number were 111000. In the next step 40, the ASIC asks whether or not the number N of the pixel is equal to 512, which is the maximum number of heating elements 5 of the printhead 3. If the answer to the question is "No", it proceeds to step 41, and adds "1" to the pixel number N and proceeds again to method step 34, this time reading the binary tone scale number from the microprocessor 17 for pixel 2. This six-bit binary number is again expanded into a data stream formed by a combination of 64 "0s" and "1s". Step 38 is again repeated, and the first data bit of this new number is loaded behind the data bit entered into the shift register 13 for pixel 1. Process steps 34–41 are iterated until the first data bits for all 512 pixels are loaded into the shift register 13, whereupon the heating elements 5 are either actuated or not actuated in accordance with the data string 15 formed from the collation of the first bits from each of the streams of data generated in step 36.

After print step 42 has been completed for the first of the 64 different tones, pixel number N is reset to zero (as is indicated in step 44), and the bit number of the expanded binary tone scale number is shifted from the first bit to the second bit, as is indicated in step 46. In step 48, the ASIC inquires as to whether or not, after step 46 has been executed, if the 64th bit has been collated into the shift register (i.e., whether or not X is equal to 64). If the answer to this question is "No", then steps 34–46 are repeated until the answer to the question in step 48 is "Yes", whereupon the row of thermal elements 5 will have completed the printing of one line of an image for one color, whereupon the microprocessor 17 proceeds to execute step 49 and to advance the paper 20 one increment so that the printhead 3 can repeat steps 32–48 and print another line of the image.

While the previously described ASIC implemented process 30 has proven its utility in a number of commercially-available printheads, the applicant has noted a number of shortcomings associated with this design which limits its usefulness. First, despite the recent availability of very high-speed RISC type microprocessors, such as the TI-32C209 processor available from Texas Instruments of Phoenix, Ariz., the relatively high number of processing steps required by the process 30 still necessitate the use of an ASIC to modulate the printhead 3. Such high-speed processors simply cannot simultaneously implement the method 30 while still controlling the other necessary functions of the various components of the printer 1, such as the periodic actuation of the motor 25 to advance the thermal paper 20, etc. The necessity for such an ASIC not only drives up the manufacturing cost of such thermal printers, but further limits the operation of the printhead to the specific types and techniques of modulation hard wired into the ASIC. Hence, the microprocessor used in combination with the printhead 30 cannot change its particular type of modulation scheme or modulation technique to improve image quality.

Figure 4:
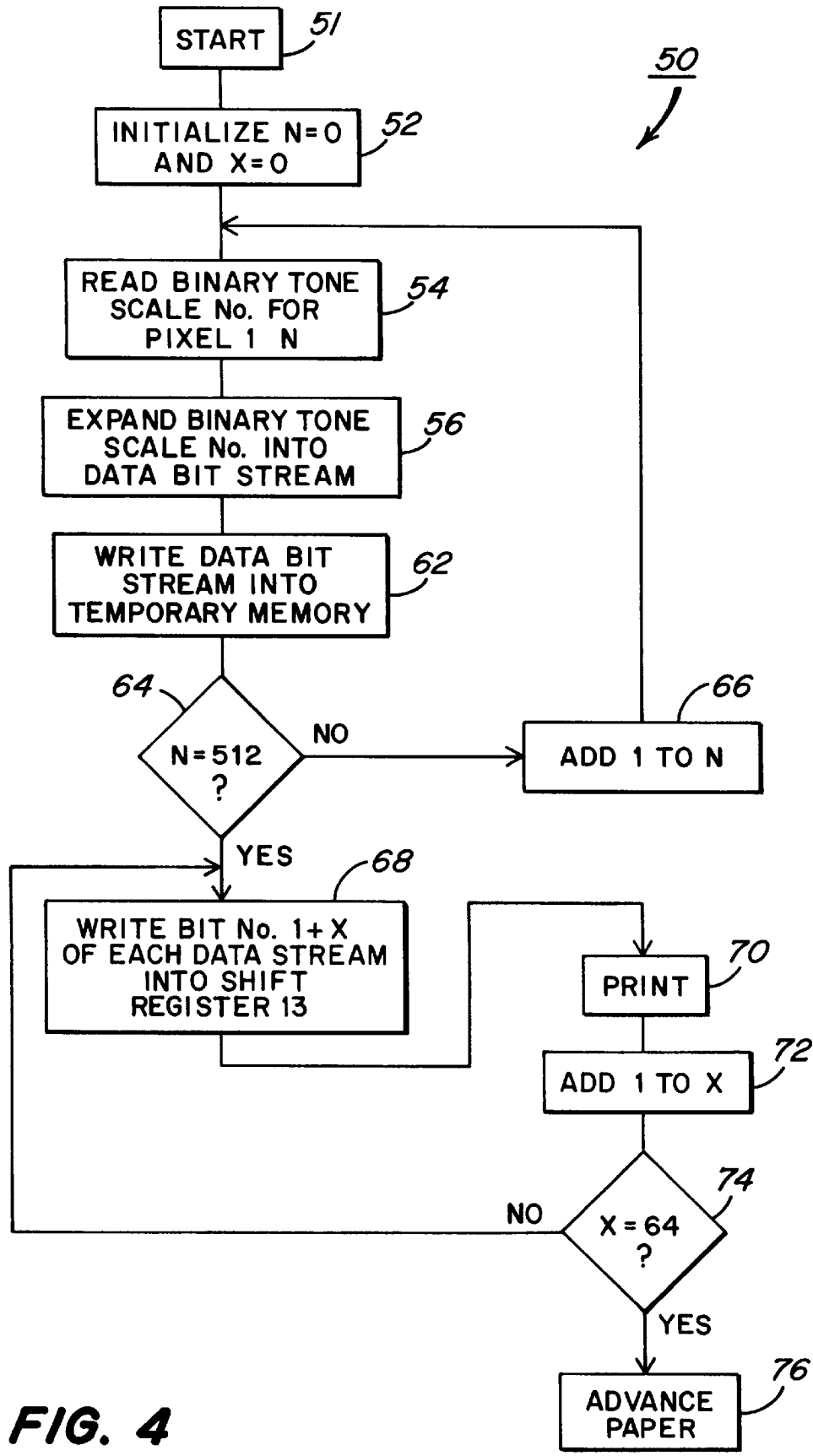
FIG. 4 is a flow chart illustrating the inventive method for operating the printer and printhead of the invention.

All of the aforementioned shortcomings associated with the prior art method are overcome by the replacement of the aforementioned ASIC with a relatively low-cost, short-term memory circuit 18 (illustrated in FIG. 1) and the adoption of the method 50 illustrated in FIG. 4. The first four steps 51, 52, 54, and 56 of the process 50 are the same as the first four steps 31, 32, 34, and 36 of the prior art method 30, i.e., the program is started, pixel number N and tone number X are both initialized to zero, the first binary tone scale number for the first pixel is read and expanded. However, at this juncture, the two methods 30 and 50 diverge. At method step 62, the data bit stream generated in step 56 is written into the temporary memory 18. After this is accomplished, the microprocessor 17 proceeds to question block 64, and asks whether or not pixel number N is equal to 512. If the answer to this inquiry is "No", then it proceeds to add 1 to pixel number N in block 66, and to iterate method steps 54, 56, and 62 until the data bit stream corresponding to the binary tone scale number for each of the pixels 1–512 has been written into the temporary memory 18.

Figure 5:
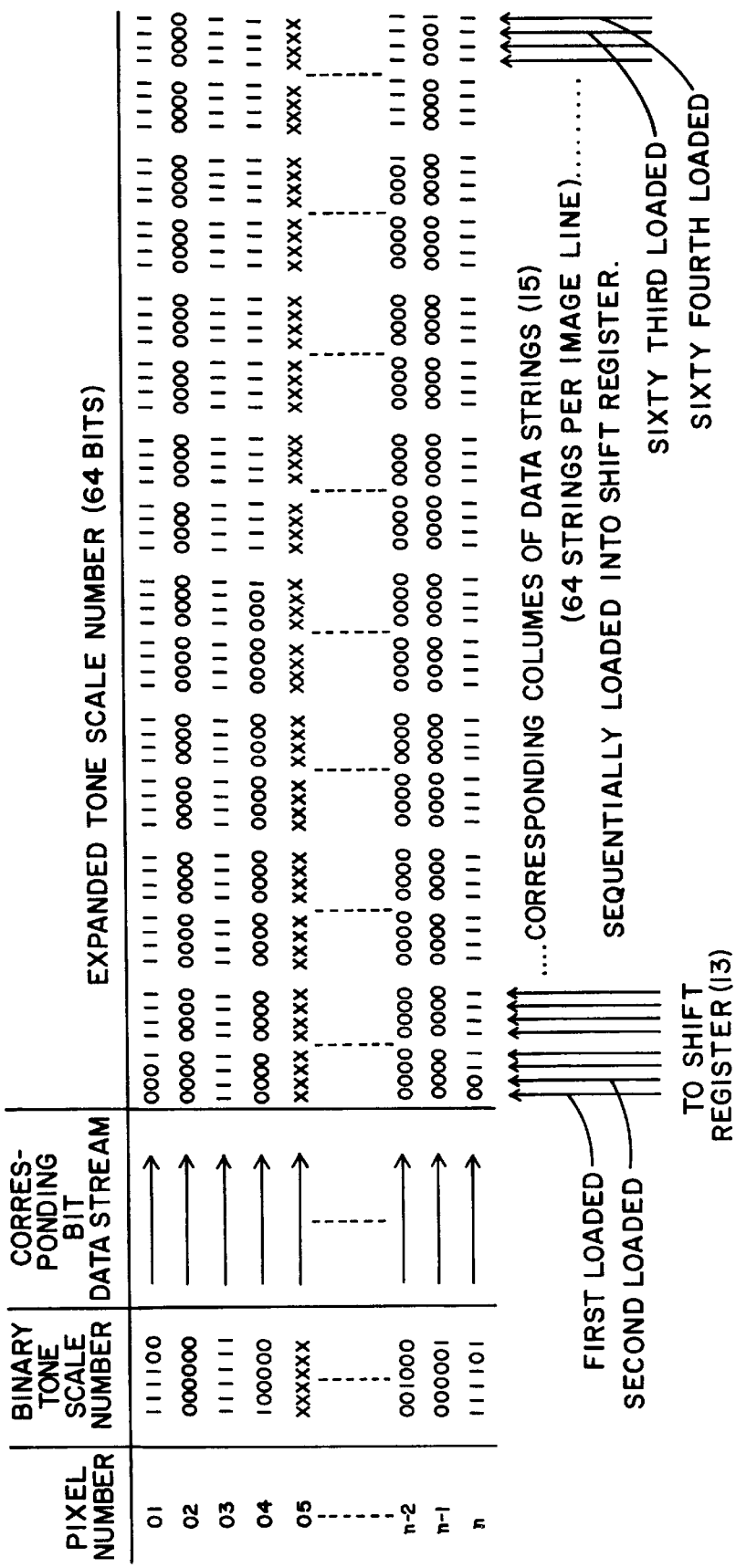
FIG. 5 is a table illustrating how the temporary memory and method of the invention operates the printhead illustrated in FIG. 2.

The effect of the iteration of steps 54–66 may best be seen in FIG. 5, in which a six-bit binary tone scale number for each of the pixels 1–N has been expanded into a 64-bit data stream. As a result of the iteration of method step 62, each bit of the data streams under the title "Expanded Tone Scale Number" has been written into the temporary memory 18.

When the answer to the inquiry posed in question block 64 is "Yes", the microprocessor 17 proceeds to write the first data bit of each of the data streams illustrated in FIG. 5 into the shift register 13. Stated differently, the microprocessor 17 loads the column formed from the first bits of each of the data streams into the shift register 13. Once this loading step is completed, the microprocessor 17 proceeds to print step 70, and actuates the thermal printing elements 5 in accordance with the "1s" and "0s" transferred from the side gates of the shift register 13 to the NAND gates 8 through the latch circuits 11. Next, the first of 64 possible tones is printed across the first line of the image in accordance with step 70, and the microprocessor proceeds to method step 72, advancing the bit number of each of the data streams to be loaded into the shift register 13 by 1. It then proceeds to question block 74, and asks whether or not the bit number equals 64. If the answer to this inquiry is "No", then it proceeds to iterate steps 68–74, which has the effect of sequentially loading the columns or data strings formed by the second, third, etc. data bits of each of the data streams into the shift register, as is schematically illustrated in FIG. 5, and sequentially printing all 64 tones on the image line via thermal elements 5. When the 64th data bit of each of the expanded tone scale numbers has been collated and loaded into the shift register 13, the microprocessor 17 answers the inquiry in question block 74 with "Yes", which indicates that the printer 1 has completed the printing of one line of the image for one color. The microprocessor 17 then proceeds to block 76 to advance the paper 20 by a single line increment by momentarily actuating platen motor 25. The method 50 is then repeated for each line of the image for each color until the image is completely printed.

Preferably, steps 51–66 can be initially executed before the initiation of the printing operation, and sequentially executed during the "advance paper" step 76 so that the microprocessor 17 will have ample capacity to execute all of the other operations required by the other components of the printer 1. Additionally, in order to minimize the required storage capacity of the memory 18, the method might operate to store only 8 bits of each of the 64-bit data bit streams at one time. While such a modification would require the microprocessor 17 to expand the binary tone scale number eight times instead of only one time in order to complete the printing of a single line of an image, the consequent reduction of required memory capacity may allow the microprocessor 1 to execute the method 50 solely by means of excess RAM within its own circuitry, thereby obviating the need for the addition of a four kilobyte memory chip to form the temporary memory 18. Such an alternative implementation is possible if a "state of the art" RISC processor is used for microprocessor 17 in view of the high-speed capabilities of such processors. Regardless of which particular alternative of the method 50 is used, the fact that each of the binary tone scale numbers has to be expanded (at most) eight times instead of 64 times leaves plenty of processing capability for the implementation of all of the other printing functions that the microprocessor 17 must implement.

PARTS LIST

1. Printer
3. Printhead
5. Thermal elements
7. Power source
8. NAND gates
9. Switching gate assembly
10. Latch circuit assembly
11. Latch circuits
12. Gates
13. Shift register
15. Image data string
17. Microprocessor
18. Temporary memory
20. Paper printing carrier
22. Dye ribbon
24. Platen roll
25. Motor
26. Enable groups a–d
27. Enable wiring group
28. Multiplex signals
30. Prior art process steps
31. START
32. Initialize
34. Read binary tone scale number
36. Expand binary tone scale number
38. Write bit number 1+X
40. Question: N=512
41. Add 1 to N
42. Print
44. Reset N=0
46. Add 1 to X
48. Question X=64?
49. Advance paper
50. Process steps of invention
51. Start
62. Write data bit stream
64. Question N=512
66. Add 1 to N
68. Write bit number 1+X into shift register for each stream
70. Print
72. Add 1 to X
74. Question: X=64?
76. Advance paper

What is claimed is:

1. A method for printing an image onto a carrier from numerical image data by means of a printer including a single microprocessor, and a printhead having a row of printing elements actuatable and deactuatable by data bits from a shift register, comprising the steps of:

expanding said numerical image data into data bits, wherein said numerical image data includes a multi-bit number for each printing element that designates a preselected color tone within a tone scale, and wherein each multi-bit number is expanded into a data bit stream capable of actuating and deactuating its respective printing element to print said preselected tone onto said carrier;

serially loading and storing said data bit streams in a temporary memory;

collating a string of data bits from said stored data bit streams and serially transferring said collated string of data bits to said shift register in response to a signal generated by the microprocessor, and activating said print element.

2. The method as defined in claim 1, wherein said microprocessor implements said expanding, storing, and transferring steps.

3. The method as defined in claim 1, wherein said numerical image data is expanded and the resulting data bits are stored in said temporary memory before the initiation of a printing operation.

4. The method as defined in claim 1, wherein said printer advances said carrier after said row of printing elements complete the printing of a line of said image, and wherein said numerical image data is expanded and the resulting data bits are stored when said printer advances said carrier.

5. The method as defined in claim 1, wherein at least a portion of said data bit stream for each printing element is stored in said temporary memory.

6. The method as defined in claim 5, further including the steps of sequentially collating the first data bit from each stored data stream into a serial string of data bits, loading said serial string of bits into said shift register, transferring said serial string of bits to said printing elements to actuate and deactuate the same, and repeating said collation step until all the data bits of each data stream has been transferred to said shift register.

7. The method as defined in claim 5, wherein only eight bits of each of said data bit streams is stored in said temporary memory at any one time.

8. The method as defined in claim 1, wherein said numerical image data is expanded into a data bit stream through the use of a look-up table.

9. The method as defined in claim 1, wherein said numerical image data is expanded into a data bit stream through the use of an algorithm.

10. A method for printing an image onto a carrier from numerical image data by means of a printer including a single microprocessor, and a printhead having a row of printing elements actuatable and deactuatable by a stream of data bits from a shift register, comprising the steps of:

expanding said numerical image data into data bit streams, wherein said numerical image data includes a multi-bit number for each printing element that designates a preselected color tone within a tone scale, and wherein each multi-bit number is expanded into a data bit stream capable of actuating and deactuating its respective printing element to print said preselected tone onto said carrier;

serially loading and storing at least a portion of each of said data bit streams in a temporary memory;

sequentially collating single bits of each of said data bit streams into a serial string of data bits, and sequentially loading said serial strings of data bits into said shift register in response to a signal generated by the microprocessor.

11. The method as defined in claim 10, wherein said printing elements are thermal printing elements.

12. The method as defined in claim 10, wherein said single microprocessor executes said expansion, storage, collating, and loading steps.

13. The method as defined in claim 10, wherein said numerical image data is expanded and the resulting data bits are stored in said temporary memory before the initiation of a printing operation.

14. The method as defined in claim 10, wherein said printer advances said carrier after said row of printing elements complete the printing of a line of said image, and wherein said numerical image data is expanded and the resulting data bits are stored when said printer advances said carrier.

15. The method as defined in claim 10, wherein said numerical image data is expanded into a data bit stream through the use of an algorithm.

16. A printer for printing an image onto a carrier from numerical image data, comprising:

a printhead having a row of printing elements actuatable and deactuatable by a string of data bits;

a register for receiving a string of data bits and transferring said bits to said printing elements to actuate and deactuate the same;

a temporary memory for storing data bit strings and for transferring collated single bits from said streams into said register;

a microprocessor means for converting said numerical image data into strings of data bits, and for controlling a serial loading band of said data bit strip into said temporary memory, wherein said numerical image data includes a multi-bit number for each printing element that designates a preselected color tone within a tone scale, and wherein each multi-bit number is expanded into a data bit stream capable of actuating and deactuating its respective printing element to print said preselected tone onto said carrier.

17. The printer as defined in claim 16, wherein said microprocessor also functions to advance said carrier after said printing elements prints a line of said image.

18. The printer of claim 16, wherein said temporary memory is formed from excess capacity in a memory circuit of said microprocessor.

19. The printer of claim 16, wherein said printing elements are thermal printing elements.

* * * * *